E. L. HALL.
CAMERA ATTACHMENT.
APPLICATION FILED APR. 27, 1907.
906,222.
Patented Dec. 8, 1908.
2 SHEETS—SHEET 1.
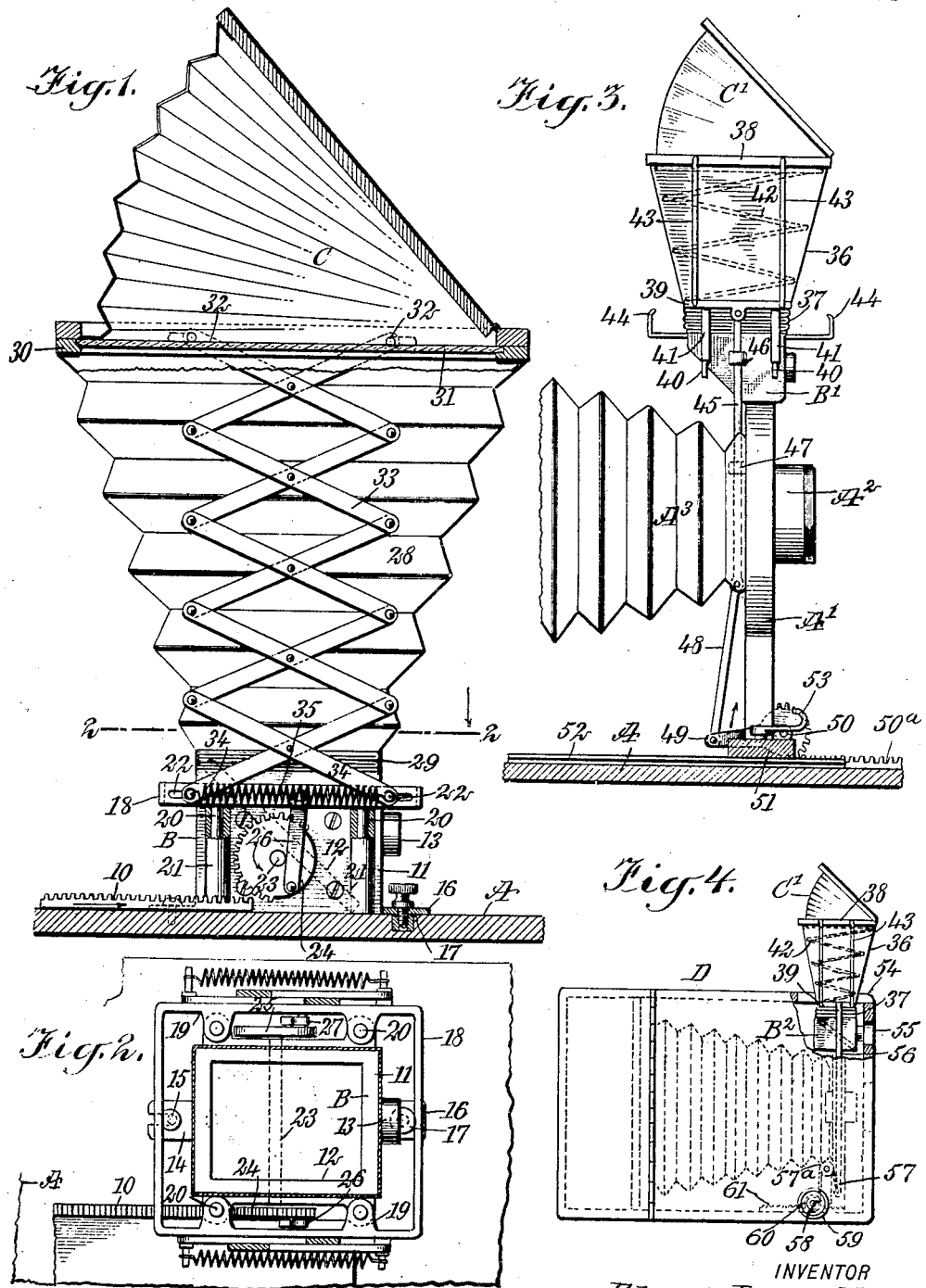
WITNESSES:
INVENTOR
Edward Lander Hall
BY
ATTORNEYS

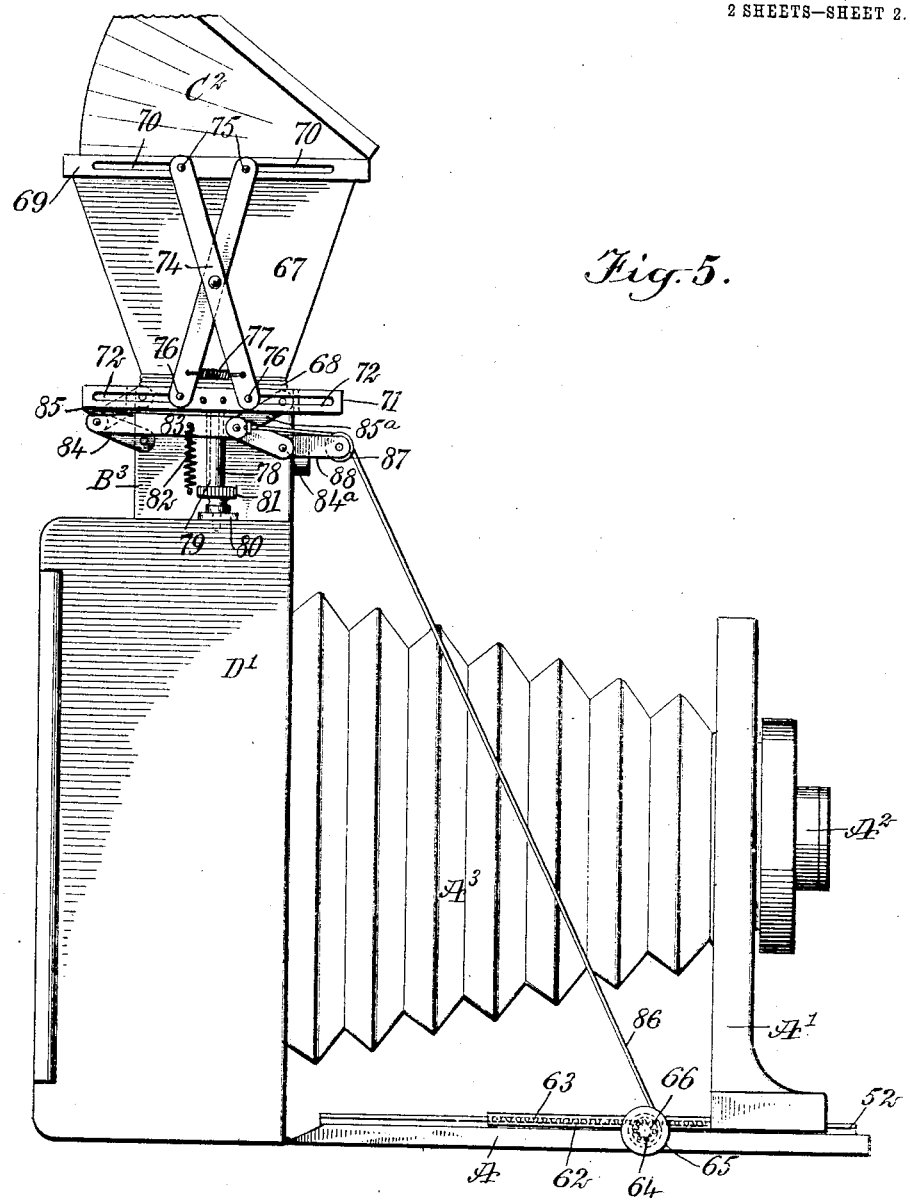

UNITED STATES PATENT OFFICE.

EDWARD L. HALL, OF NEW YORK, N. Y.

CAMERA ATTACHMENT.

No. 906,222.  Specification of Letters Patent.  Patented Dec. 8, 1908.

Application filed April 27, 1907. Serial No. 370,631.

*To all whom it may concern:*

Be it known that I, EDWARD LANDER HALL, a citizen of the United States, and a resident of the city of New York, borough of Manhattan, in the county and State of New York, have invented a new and Improved Camera Attachment, of which the following is a full, clear, and exact description.

The purpose of the invention is to provide a construction of a camera finder provided with an adjustable hood that is applicable to any type of camera and which can be expeditiously and conveniently fitted thereto, and which is also capable of being readily removed.

It is also the purpose of the invention to so construct and apply the finder attachment, that the bellows of the hood will be automatically raised and lowered as the photographic lens is adjusted to obtain a focus, the image appearing upon the ground glass as clearly and under similar conditions, as it would be projected upon the plate to be exposed.

It is also a purpose of the invention to provide a finder of the character described that will be not only simple, durable and economic in construction, but which will also be accurate and reliable in operation.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a sectional side elevation of the improved finder attachment, and a section through the portions of the front drop board of a camera to which it is applied; Fig. 2 is a horizontal section taken practically on the line 2—2 of Fig. 1; Fig. 3 is a side elevation of a portion of the focusing board of another form of camera, carrying the photographic lens and a portion of the attached bellows, a portion of the front drop board being shown in section, and the said view which is drawn upon a smaller scale, also illustrates the improved finder attachment as applied to the focusing board; Fig. 4 is a side elevation of a box camera drawn upon a reduced scale, parts thereof being broken away to illustrate the adaptation of the finder attachment thereto; and Fig. 5 is an enlarged side elevation of a drop board camera, and a slightly modified form of the finder attachment applied to the box body of the camera.

A represents the front drop board of a camera box upon which the front or focusing board A' has movement, which board A' carries the photographic lens A² and is attached to the forward portion of the camera bellows A³ being likewise provided with the customary rack 10 mounted to slide upon the front drop board A.

The finder B consists of a box body 11, which may be secured to the upper face of the front drop board A in any suitable or approved manner.

In the drawings the box body 11 of the finder is shown provided with a slotted lip 14, extending from its rear surface to an engagement with a pin 15 secured to the said drop board, while a corresponding lip 16 located at the front of the box body 11 of the finder is provided with a set screw 17, that enters a suitable threaded socket in the aforesaid drop board, as is shown in Fig. 1, and the body 11 of the finder is provided with the customary front lens 13.

A skeleton rectangular frame 18 is shown as loosely surrounding the box body 11 of the finder, and the side portions of this frame are provided with inwardly extending lugs or ears 19, and guide rods 20 are attached to these ears, which guide rods extend down into sockets 21 secured to the side faces of the box body of the finder, as is illustrated in Fig. 1, and each side bar of the frame 18 is provided with a longitudinal slot 22 at each of its ends, the said frame 18 being vertically movable around the body of the finder. A shaft 23 extends through the body of the finder below the mirror 12 therein, which mirror has the customary angle of 45° and reflects the image produced thereon by a lens 13. The shaft 23 is journaled in the sides of the body 11 of the finder, and is provided at one end with a pinion 24 that engages with the rack 10 and at its opposite end the shaft is provided with a disk 25. A link 26 is connected with the pinion 24 by means of a suitable wrist pin, and with the inner portion of the side member of the frame 18, while the corresponding link 27 is connected in the same manner with the disk 25 and with the opposing side member of the frame 18.

The lower end of a bellows 28 is secured to the upper portion of the body 11 of the finder B, the said bellows being provided at its lower portion with a series of reserve folds 29, as is shown in Fig. 1, and the said bellows 28 is widest at its upper end, and at said upper end is provided with a frame 30, which frame carries a ground glass 31, and above the frame 30 the conventional sight hood C is adjustably located. The upper ends 32 of lazy tongs 33 are slidably connected with the side members of the upper frame 30; these lazy tongs are at opposite sides of the bellows 28 and their lower ends 34 are connected by means of pins with the frame 18, the pins passing through the slots 22 in the side bars of the said frame. A spring 35 is connected with the lower members of each lazy tong, as is shown in Figs. 1 and 2, and these springs serve to draw the lower ends of the lazy tongs together and thus force the said lazy tongs upward when the bellows 28 is released from any device that may be employed to hold it in a folded position.

As the lens board A' is carried outward or inward to obtain the proper focus, the rack 10 engaging with the teeth of the pinion 24 will cause the bellows 28 to be raised or lowered, drawing upon the reserve folds 29 at such time, and when the proper focus has been obtained, it will be found that the image is simultaneously focused on the ground glass, thus the focusing of the image on the ground glass is automatically and simultaneously obtained with the proper focus of the lens $A^2$ relatively to the plate to be exposed, and under all conditions of use when the finder has been properly set the same conditions will prevail.

While not absolutely essential to the operation of the device, the lens 13 should be of the same focal length as the lens $A^2$.

In Fig. 3 of the drawings, I have illustrated the finder box B' as attached to the upper edge of the focusing board A' for the camera. The finder box B' is of the same construction as that which has been described, except that the shaft 23 and accompanying parts are omitted. A bellows 36 corresponding to the bellows 28 is attached to the upper portion of the finder box B', being provided at its lower portion with reserve folds 37, and a frame 38 is attached to the upper end of the bellows 36, in which frame the ground or focusing glass is mounted, and at the upper end portion of the said bellows the sight hood C' is placed.

A frame 39 practically corresponding to the frame 18 is mounted to slide above the finder box B', and this frame 39 is provided at its sides with downwardly extending guide rods 40 that move in guide sockets 41 secured to the finder B', and flexible connections 43 are provided between the frame 39 and the upper frame 38 and one or more springs 42 is located in the bellows 36 which automatically tends, when the bellows is released, to carry the bellows upward the extent of the flexible connection 43. When the bellows is entirely collapsed, it may be held in such condition by engaging spring keepers 44 carried by the finder B'.

A rod 45 is pivotally attached to a side of the frame 39, the said rod having sliding movement in a lug 46 located at the side of the finder and a lug 47 located at the rear of the focusing board A', and a link 48 pivotally connects the lower end of the rod 45 with a rearward extension 49 from the pinion 50, which pinion is mounted to turn on suitable bearings carried by a foot piece 51 of the lens board A', which foot piece travels in the customary guides 52 carried by the front drop board A. The foot piece 51 of the focusing board A' is held in adjusted position by means of the usual clamp 53. In this instance the teeth of the pinion 50 engage with the teeth of a rack $50^a$ that is secured to the upper face of the front drop board A. Two plunger bars 45 and connecting links 48 may be employed if desired, but one has been found to be sufficient.

In the operation of this form of the device, when the bellows 36 is released, the spring 42 acts to open the bellows to a limited extent, then as the lens $A^2$ of the camera is moved in or out to obtain the proper focus relatively to the plate to be exposed, the bellows 36 of the finder is moved up or down automatically through the mechanism described, to such an extent as to obtain a correspondingly accurate focus on the focusing or ground glass plate in the finder bellows.

In Fig. 4 I have illustrated the adaptation of the finder to what is known as a box camera D. The finder $B^2$ is located within said box camera, having been introduced through an opening 54 in the top, and the lens 13 of the finder is opposite the opening 55 in the front of the box D, as is customary. The finder $B^2$ is provided with the same form of bellows and hood as is shown in Fig. 3, and the said parts are designated by corresponding reference numerals, but instead of employing the operating rod 45 and accompanying link 48, a sliding rod 56 is attached to the frame 39, the said sliding rod 56, has guided movement at the inner side face of the camera box, as is shown in dotted lines in Fig. 4, and a cable 57 is attached to the lower end of the sliding rod 56, the said cable 57 being passed over a guide pulley $57^a$ that is suitably mounted on the same side of the camera box at which the rod or bar 56 has movement, and the said cable 57 is attached to a shaft 58 turned by means of a hand wheel 59 located at the outside of the camera box, and the said shaft 58 is provided with a pinion 60, that engages with a rack 61 connected with the focusing board A', as is shown also in dotted lines in Fig. 4, so that after the finder has been properly attached, as the shaft 58 is turned to effect a proper focusing of the camera, a correspondingly accurate focus is automatically obtained at the focusing plate of the bellows 36.

In Fig. 5 I have illustrated another slight modification of the device, wherein it is shown attached to the upper face of the box body D' of a camera having a front drop board A. In this type of camera the lens board A' is provided with a housing 63 that extends to the rear over the front drop board A' and over a rack 62, both of which are attached to the lens board A and move with said board. The adjustment of the lens board A' is effected through the medium of a shaft 64 which corresponds to the shaft 58 above mentioned, and this shaft 64 is also provided with a knob 65 at its outer end whereby to turn the same and cause a pinion 66 carried by the said shaft and which engages with the rack 62 to move the lens board A' inward or outward.

The box body of the finder $B^3$ is provided also with a bellows 67, having reserve folds 68 at its lower end, and a frame 69 at its upper end in which the ground glass or focusing plate is located, and a sight hood $C^2$ above the frame 69. The side pieces of the frame 69 are provided with longitudinal slots 70 near each of its ends, and a rectangular frame 71 is mounted to slide at the lower portion of the said bellows, and the side members of this lower or sliding frame 71 is provided with longitudinal slots 72, that correspond to the slots 70 above named.

Cross and pivotally connected links 74 are located at the opposite sides of the bellows, and pins 75 at the upper ends of these links are made to travel in the slots 70 of the upper frame 69, and pins 76 at the lower ends of the links 74 travel in the slots 72 on the lower or sliding frame 71, and a spring 77 connects the lower parts of the links 74, whereby when the bellows 67 is released from whatever retaining device there may be employed, automatically and immediately the bellows is forced upward a predetermined distance. The other and final adjustments to the bellows, being accomplished through the medium of the focusing mechanism of the camera in substantially the following manner. Guide rods 78 are secured to the side members of the sliding frame 71, and these rods move in guide sockets 79 secured to the corresponding sides of the body of the finder $B^3$, the finder $B^3$ also being attached to the box body B' of the camera in any suitable or approved way, as, for example, in the manner described with reference to the construction shown in Fig. 1, the locking of the finder in position being effected by passing a set screw 81 through a foot 80 extending from a side of the finder.

A spring 82 is attached to a horizontal link 83 and to the finder exerting downward tension on the link. The link 83 is just below a side member of the sliding frame 71, and at what may be termed the rear end of the link 83 two short links 84 and 85 are pivotally connected, pointing toward the front but extending in opposite directions one upward and the other downward, the short link 84 being pivotally attached to the finder $B^3$, and the upper short link 85 being pivotally attached to the inner face of the adjacent side member of the sliding frame 71. The line 83 is actually a connecting bar for two sets of links, namely the rear set 84 and 85 and a corresponding forward set $84^a$ and $85^a$, the forward set facing in the same direction as the rear set, and the forward set of links are pivotally connected to the forward end of the connecting bar 83, the outer end of the forward link $85^a$ being attached to the same member of the frame 71 as the corresponding link 85, while the outer end of the lower link $84^a$ is pivotally attached to the finder $B^3$. A cable 86 is secured at one of its ends to the shaft 64, and this cable extends upward and is passed over a guide roller 87, that is at the forward end of a forwardly extending arm 88 secured to the finder $B^3$.

In the operation of this form of the device, the first automatic adjustment of the hood having been obtained, as the focusing mechanism of the camera is operated to obtain the proper focal relation between the lens $A^2$ and the plate to be exposed, the hood 67 will be automatically raised or lowered, so that the same focal relation will be maintained between the lens 13 of the finder, and the focusing plate of the hood connected with the finder.

I desire it to be understood that in the construction of the device, other means may be employed for extending the hood of the finder at its initial movement than the means shown; that is to say, any equivalents thereof may be substituted, and that the details of the mechanism for bringing about the simultaneous movements of the focusing mechanism of the camera and the focusing mechanism of the finder, may be also varied without departing from the spirit of the invention, which consists in the combination of the focusing mechanism of the camera with the focusing mechanism of the finder, to bring the two said mechanisms simultaneously in the same focal relation relatively to the photographic lens and the plate to be exposed.

Having thus described my invention, I claim as new and desire to secure by Letters Patent,—

1. In cameras, a finder, a bellows connected with the finder, a focusing glass at the upper portion of the bellows, and a hood above the focusing glass, automatic controlling means for the focusing glass having limited action relatively thereto, an auxiliary controlling device for the focusing glass, and controlling means for the auxiliary controlling device adapted to be operated by the focusing mechanism of the camera.

2. In a camera, the combination with the camera box and the focusing mechanism for the camera, of a finder supported on the box, a bellows secured to the said finder, a hood for the bellows, a focusing plate intervening the hood and the bellows, devices for automatically opening the bellows a limited distance, the bellows being provided with reserve folds when so opened, and means operated by the focusing mechanism of the camera, for further adjusting the focusing plate of the finder to or from the same, whereby to obtain the same focal relation between the lens of the finder and its focusing plate as between the lens of the camera and the plate to be exposed.

3. In a camera, the combination with the body of the camera and its focusing mechanism, of a finder carried by the camera box, a bellows secured to the said finder extending upwardly therefrom, having a series of reserve folds adjacent the finder, a focusing plate at the upper portion of the said bellows, and a hood above the focusing plate, expanding devices for the bellows, operating thereon to a limited extent, means for raising and lowering the focusing plate, bringing into action the reserve folds, and an operating device for the said means in operative connection with the focusing mechanism of the camera, whereby as the lens of the camera is moved outward or inward the bellows of the focusing plate will be moved upward or downward, the extent of the movement of the focusing plate corresponding to the extent of the movement of the lens of the camera, in that the same focal relation will be automatically obtained between the lens of the camera and the plate to be exposed, as between the lens of the finder and its focusing plate.

4. In a camera, the combination with a camera box and the focusing mechanism for the camera, of a finder supported on the box, a vertically disposed bellows secured to said finder, a hood for the bellows, a focusing plate intervening between the hood and the bellows, devices for automatically opening the bellows a limited distance, reserve folds for the bellows adapted for operation in the final adjustment of the bellows, and means operated by the focusing mechanism of the camera for the final adjustment of the focusing plate of the finder to or from the same, whereby to obtain the same focal relation between the lens of the finder and its focusing plate, as between the lens of the camera and the plate to be exposed.

5. In a camera, the combination with a movable camera lens, of a finder having a finder lens, a reflecting mirror and a ground glass, the said reflecting mirror and ground glass having movement towards and from each other, and at a right angle relative to the movement of the said camera lens.

6. In a camera, the combination with a camera lens and the operating mechanism for moving the same toward and from the sensitive plate or film, of a finder lens, reflecting mirror, ground glass, and means for moving the ground glass relative to the said mirror, the said means being connected with the said operating mechanism to be actuated by the latter and to adjust the focal relation between the mirror and ground glass in unison with the movement given to the said camera lens, the movement of the said ground glass relative to the mirror being at right angles to the movement of the said camera lens to the sensitive plate or film.

7. A camera provided with a finder having a frame, a finder lens, a mirror, a ground glass, bellows connecting the said frame with the said ground glass and having reserve folds, means for extending the bellows to their normal length, and means for supplemental extension of the bellows by the said reserve folds.

In testimony whereof I have signed my name to this specification in the presence of two subscribing witnesses.

EDWARD L. HALL.

Witnesses:
J. FRED ACKER,
JOHN P. DAVIS.